United States Patent
Bertelli et al.

(10) Patent No.: US 9,202,137 B2
(45) Date of Patent: Dec. 1, 2015

(54) FOREGROUND OBJECT DETECTION FROM MULTIPLE IMAGES

(71) Applicant: Google Inc., Mountain View, CA (US)

(72) Inventors: Luca Bertelli, Santa Barbara, CA (US); Dennis Strelow, San Jose, CA (US); Sally A. Goldman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/260,966

(22) Filed: Apr. 24, 2014

(65) Prior Publication Data

US 2015/0169989 A1 Jun. 18, 2015

Related U.S. Application Data

(63) Continuation of application No. 12/618,538, filed on Nov. 13, 2009, now abandoned.

(60) Provisional application No. 61/114,446, filed on Nov. 13, 2008.

(51) Int. Cl.
*G06K 9/00* (2006.01)
*G06K 9/62* (2006.01)

(52) U.S. Cl.
CPC ...... *G06K 9/6202* (2013.01); *G06K 2009/6213* (2013.01)

(58) Field of Classification Search
None
See application file for complete search history.

(56) References Cited

U.S. PATENT DOCUMENTS

| | | | |
|---|---|---|---|
| 6,924,832 B1 | 8/2005 | Shiffer | |
| 7,379,627 B2 | 5/2008 | Li | |
| 2004/0151374 A1* | 8/2004 | Lipton | G06K 9/00771 382/181 |
| 2005/0105780 A1 | 5/2005 | Ioffe | |
| 2005/0271273 A1* | 12/2005 | Blake | G06K 9/00624 382/173 |
| 2006/0215880 A1 | 9/2006 | Berthilsson | |
| 2007/0005356 A1* | 1/2007 | Perronnin | G06K 9/4676 704/245 |
| 2008/0019587 A1* | 1/2008 | Wilensky | G06T 7/0083 382/159 |
| 2008/0052643 A1 | 2/2008 | Ike | |
| 2008/0187213 A1 | 8/2008 | Zhang | |
| 2008/0240500 A1* | 10/2008 | Huang | G06K 9/38 382/103 |
| 2008/0240504 A1 | 10/2008 | Grosvenor | |
| 2008/0247609 A1 | 10/2008 | Feris | |
| 2008/0304742 A1* | 12/2008 | Connell | G06K 9/38 382/170 |
| 2009/0060278 A1* | 3/2009 | Hassan-Shafique | G06K 9/00771 382/103 |
| 2009/0208118 A1* | 8/2009 | Csurka | G06K 9/00664 382/228 |

(Continued)

OTHER PUBLICATIONS

On the Plausibility of the—saliency, Gao et al,. DOI: 10.1167/8.7.13, Jun. 13, 2008, pp. 1-18.*

(Continued)

*Primary Examiner* — Jayesh A Patel
(74) *Attorney, Agent, or Firm* — Fish & Richardson P.C.

(57) ABSTRACT

A method for determining a salient region of an image is disclosed. For a plurality of different saliency cue functions, a single saliency value is calculated for each pixel in a plurality of adjacent pixels in an image using the saliency cue function, wherein one of the saliency cue functions is based on whether the pixel is in a region of the image whose colors contrast with the region's background and another of the saliency cue functions is based on a foreground and background color models of the image. A classifier is used to calculate a combined single saliency value for each pixel based on the single saliency values for the pixel. The salient region of the pixels is determined with a subwindow search based on the combined single saliency values.

12 Claims, 8 Drawing Sheets

(56) References Cited

U.S. PATENT DOCUMENTS

2010/0046830 A1 2/2010 Wang
2011/0221926 A1 9/2011 Kanaev

OTHER PUBLICATIONS

Bertelli et al., "A Variational Framework for Multiregion Pairwise-Similarity-Based Image Segmentation," IEEE Transactions on Pattern Analysis and Machine Intelligence, Aug. 2008, 30(8):1400-1414.
Comaniciu and Meer, 'Mean Shift: A robust approach toward feature space analysis,' IEEE Pattern Analysis and Machine Intelligence, May 2002, 37 pages.
Duda et al., 'Pattern Classification,' Second edition, Wiley Interscience, 2000, Chapter 4, 67 pages.
Felzenszwalb and D. Huttenlocher. "Efficient graph-based image segmentation." International Journal of Computer Vision, 2(50): 167-181, 2004.

Gao et al., "On the plausibility of the discriminant center-surround hypothesis for visual saliency," ISSN 1534-7362, Journal of Vision 8(7):13, 1-18 (2008).
Lampert et al., "Beyond Sliding Windows: Object Localization by Efficient Subwindow Search," Computer Vision and Pattern Recognition, IEEE Conference on, Jun. 2008, pp. 1-8.
Liu et al. "Learning to detect a salient object," IEEE Computer Vision and Pattern Recognition, 2007, pp. 1-8.
Rahmani et al., "Localized Content Based Image Retrieval," IEEE Transactions on Pattern Analysis and Machine Intelligence, 2008, 1-10.
Shalev-Shwartz et al., "Pegasos: Primal estimated sub-gradient solver for SVM," ACM International Conference on Machine Learning, 2007, 8 pages.
Shotton et al., "TextonBoost: Joint appearance, shape and context modeling for multi-class object recognition and segmentation," European Conference on Computer Vision, 2006, 14 pages.
Zivkovic, "Improved Adaptive Gaussian Mixture Model for Background Subtraction," Proceedings of the 17th International Conference of Pattern Recognition, Apr. 2004, 2:28-31.

\* cited by examiner

FOREGROUND OBJECT DETECTION FROM MULTIPLE IMAGES

CROSS REFERENCE

This application is a continuation and claims the benefit of U.S. patent application Ser. No. 12/618,538 filed Nov. 13, 2009 and entitled "Foreground Object Detection From Multiple Images," which claims the benefit under 35 U.S.C. §119 (e) of the filing date of U.S. Patent Application No. 61/114,446, filed Nov. 13, 2008, and entitled "Foreground Object Detection From Multiple Images," the contents of which are incorporated herein by reference.

BACKGROUND

Accurate saliency detection (a.k.a. subject or foreground detection) can be used for auto cropping images or for restricting annotation, visual similarity search, or clustering to images' subjects. In some auto cropping, visual similarity search, or clustering problems, multiple related images exist. For instance, online news aggregators collect images for the same story from many sources or for an ongoing story, a continuing sequence of images from one source.

SUMMARY

In general, one aspect of the subject matter described in this specification can be embodied in a method that includes for a plurality of different saliency cue functions, calculating a single saliency value for each pixel in a plurality of adjacent pixels in an image using the saliency cue function. One of the saliency cue functions is based on whether the pixel is in a region of the pixels whose colors contrast with the region's background and another of the saliency cue functions is based on foreground and background color models of the image. A classifier is used to calculate a combined single saliency value for each pixel based on the single saliency values for the pixel. A salient region of the pixels is determined with a subwindow search based on the combined single saliency values.

Another aspect of the subject matter described in this specification can be embodied in a method that includes for each image in a set of images and for a plurality of different saliency cue functions, a single saliency value is calculated for each pixel in the image using the saliency cue function, wherein one of the saliency cue functions is based on whether the pixel is in a region of the image whose colors contrast with the region's background and another of the saliency cue functions is based on foreground and background color models of the image. Each image in the set of images is segmented into two or more segments. For each segment, a diverse density saliency value is calculated for the segment indicating how similar the segment is to the other segments in each image in the set of images. A linear combination is used to calculate a combined diverse density saliency value for each pixel based on a combined single saliency value calculated based on the single saliency values for the pixel and the diverse density saliency value of the segment including the pixel. A salient region of the pixels of each image is determined with a subwindow search based on the combined single saliency values.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other features, aspects, and advantages of the invention will become apparent from the description, the drawings, and the claims.

Saliency cues based on whether the pixel is in a region of the image whose colors contrast with the region's background and based on foreground and background color models of the image allow for a more accurate salient region detection. Using multiple image, rather than a single image, also allows for a more accurate salient region detection.

BRIEF DESCRIPTION OF THE DRAWINGS

Like reference numbers and designations in the various drawings indicate like elements.

DETAILED DESCRIPTION

Figure 1A:
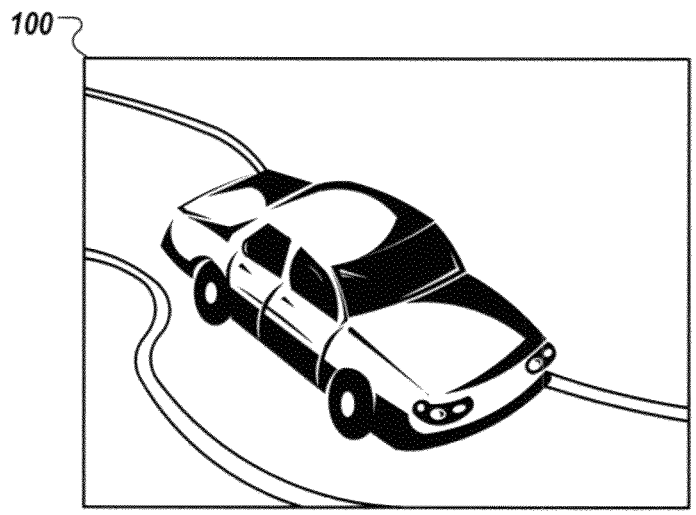
FIGS. 1a and 1b illustrate an example system for saliency detection using single and multiple images.
Figure 1B:
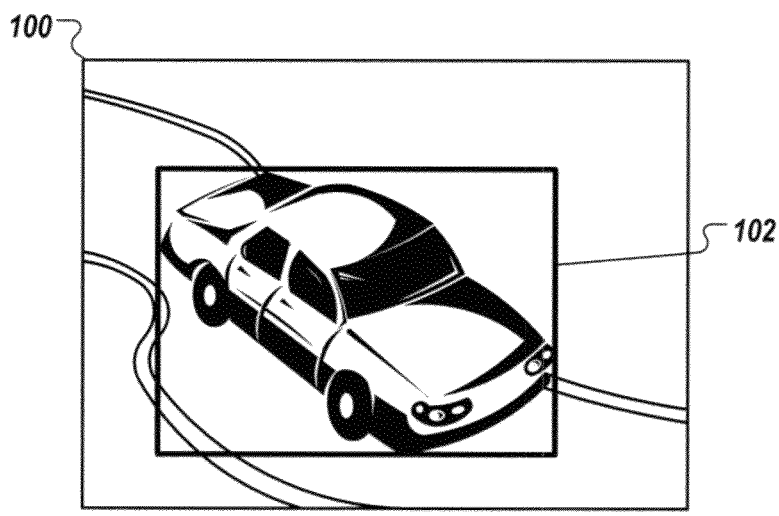

FIGS. 1a and 1b illustrate an image 100. The image 100 is one that has not been processed by the salient region detection system described below. The subject of the image 100 is the car as identified by the human eye. The system described will show how the image 100 can be processed into FIG. 1b where the car 102 is automatically detected.

Figure 2:
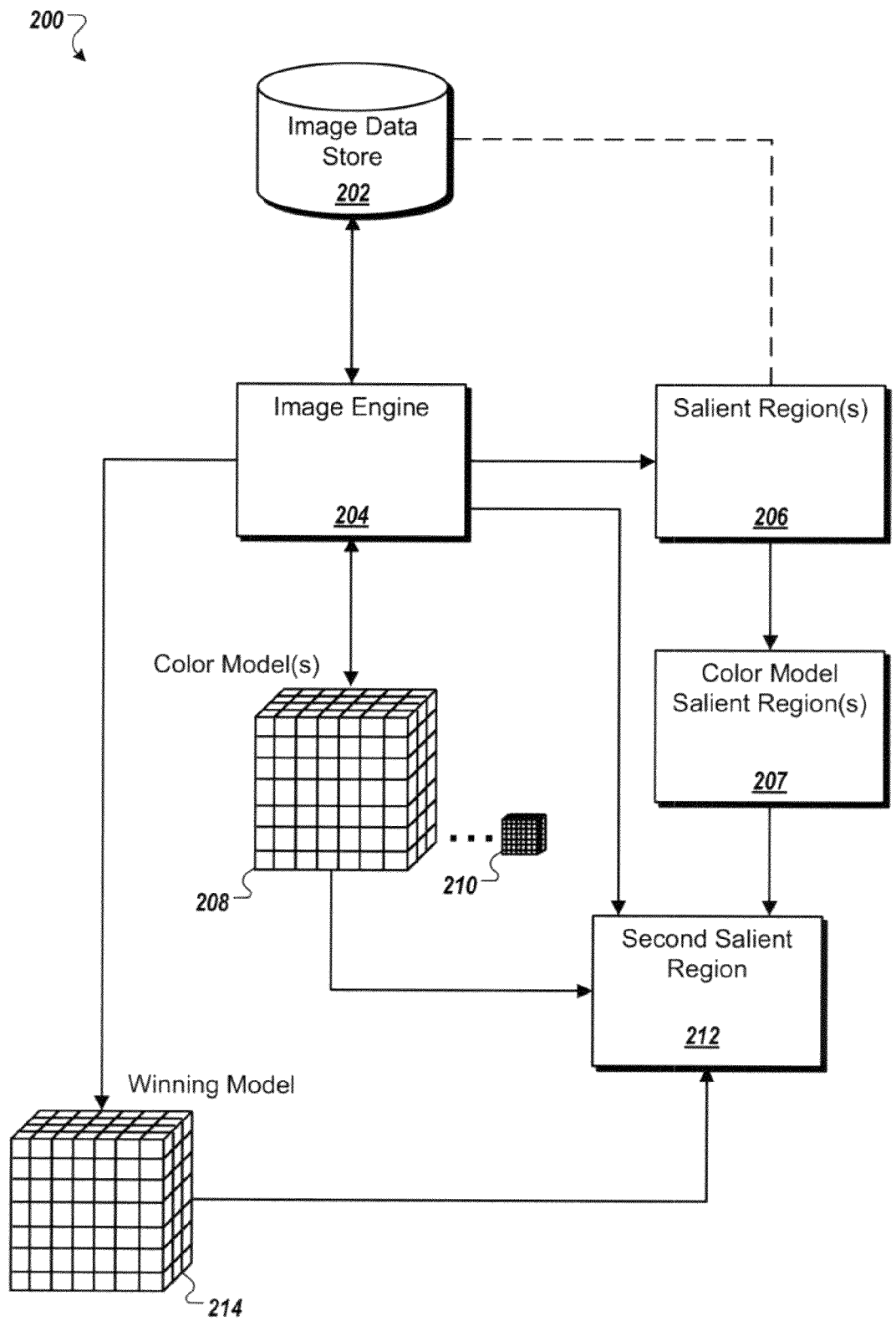
FIG. 2 illustrates an example image that has salient regions detected.

FIG. 2 illustrates an example system 200 for identifying candidate salient regions of an image. A salient region is a main subject of an image. For example, in an image of a swimmer swimming in a pool, the salient region is the swimmer. In an image of a car on a road, the main image is the car. The system 200 includes an image engine 204 that performs one or more functions for identifying salient regions in a set of images. The system 200 generally, for a plurality of different saliency cue functions, calculates a single saliency value for each pixel in a plurality of adjacent pixels in an image using the saliency cue functions, wherein one of the saliency cue functions is based on whether the pixel is in a region of the image whose colors contrast with the region's background and another of the saliency cue functions is based on a foreground and background color models of the image. The system 200 uses a classifier to calculate a combined single saliency value for each pixel based on the single saliency values for the pixel, determines a salient region of the pixels with a subwindow search based on the combined single saliency values.

The system 200 can also identify the salient region using another method. The system 200 generally, for each image in a set of images and for a plurality of different saliency cue functions, calculates a single saliency value for each pixel in a plurality of adjacent pixels in an image using the saliency cue function, wherein one of the saliency cue functions is based on whether the pixel is in a region of the image whose colors contrast with the region's background and another of the saliency cue functions is based on a foreground and background color models of the image. The system 200 segments each image in the set of images into two or more segments. For each segment, the system 200 calculates a diverse density saliency value for the segment indicating how similar the segment is to the other segments in each image in the set of images. The system 200 uses a linear combination to calculate a combined single saliency value for each pixel based on the single saliency values for the pixel and the diverse density saliency value, and determines a salient region of the pixels with a subwindow search based on the combined single saliency values.

These processes will be described in greater detail below.

Single Image Saliency

The system 200 includes a data store 202 that includes one or more images. An image engine 204 calculates single saliency values using saliency cue functions and combines them into a final saliency map by scoring individual pixels of an image with a Support Vector Machine (SVM) or other classifier. A saliency map is a matrix or image that provides an estimate of how salient pixels in the image are. One SVM that can be used is the Pegasos SVM, described in S. Shalev-Shwartz, Y. Singer, and N. Srebro. "*Pegasos: Primal estimated sub-gradient solver for SVM.*" ACM international conference on machine learning, 2007. A salient region, e.g., rectangle, is the one region that best encompasses the strong responses in the final saliency map while excluding the weak responses, and which is detected using an efficient subwindow search (ESS).

In some implementations, one saliency cue function is a multi-scale cue function and is based on a multi-scale contrast of a pixel. Contrast information, such as strong gradient regions and edges, is commonly known for stimulating the human visual attention system and therefore has been widely used as a feature for saliency detection. The image engine 204 captures the contrast information by averaging gradient information across multiple level of a Gaussian pyramid. The single saliency value is calculated based on the multi-scale contrast cue according to the following formula:

$$f_1(x) = \sum_{s=1}^{N} \sum_{x' \in W(x)} \|I^s(x) - I^s(x')\|^2 \quad (1)$$

where s is the scale in the N-level Gaussian pyramid and W(x) is a square window centered at pixel x.

Another saliency cue function is a color spatial distribution cue function and is based on a spatial distribution of a pixel's color. The degree of spatial scatter of a certain color cluster can be evaluated in order to generate this cue. Non-parametric density estimation and a mean shift algorithm are used to determine the number of color clusters. Non-parametric density estimation is described in Duda, Hart, and Stork, "*Pattern Classification*," Second edition, Wiley Interscience, 2000. The mean shift algorithm is described in Comaniciu and Meer, "*Mean Shift: A robust approach toward feature space analysis*," IEEE Pattern Analysis and Machine Intelligence, May 2002. The degree of scatter of each color cluster is evaluated. The single saliency value of the pixel is set to be inversely proportional to the degree of scatter of the cluster to which it belongs.

Another saliency cue function is a super-pixel based center surround cue and is based on whether the pixel is in a region of the image whose colors contrast with the region's background. For each pixel in an image, a determination is made as to whether the pixel is part of a region whose colors contrast highly with the region's background, i.e., has a high center-surround. A set of super-pixels is defined as:

$S = \{s_i | i = 1, \ldots, M\}$ composed by $M$ super-pixels.

Super-pixel computation is described in the algorithm described in P. Felzenszwalb and D. Huttenlocher. "*Efficient graph-based image segmentation.*" International Journal of Computer Vision, 2(50): 167-181, 2004. A neighborhood of super-pixel is defined as:

$N(s) = \{s_i | s_i \text{ is 8-connected to } s\}$ (if s touches the boundaries of the image, the image engine 204 mirrors it adding a super-pixel identical to s to its neighborhood). $\chi_{SN}^2(s)$ the chi square distance between the color histogram of s and the color histogram of N(s) is calculated. The algorithm for calculating the single saliency value of a pixel based on the super-pixel based center surround cue, described below as Algorithm 1, starts from each super-pixel and expands it, by taking the union with the neighbor that produces the highest $\chi_{SN}^2$. In the process the $\chi SN^2$ value can be recorded as a measure of saliency for the current super-pixel. The expansion is terminated when it covers the entire image domain. In some implementations, the expansion process can be limited to a certain number of iterations, which can significantly speed up the computation and has little effect on the obtained saliency map, a per pixel map that indicates the pixel's saliency.

Algorithm 1:

for all $s_i \in S$ do
    $f(s_i) = 0$
    $t = s_i$
    while $N(t)$ is not empty do
        $s_{max} = \text{argmax}_{s_j \in N(t)} \chi_{SN}^2 (t \cup s_j)$
        $t = t \cup s_{max}$
        $f(s_i) = \max(f(s_i), \chi_{SN}^2(t))$
    end while
end for where S is a set of pixels in the image, N(t) is a set of neighboring segments of t, and $\chi_{SN}^2(s)$ the chi square distance between a color histogram of s and a color histogram of N(s)

Another saliency cue function is a color model cue and is based on foreground and background color models of the image. This cue reflects the tendency for subjects to be closer to the center of the image than the edge. The image engine 204 randomly samples locations on the image with high probability close to an image center and low probability at the image boundaries. The sampled values can then be used to train a Gaussian Mixture Model (GMM), which would be the model for the foreground object, while the remaining pixels can be used to train a GMM for the background. For every pixel x, the image engine 204 evaluates the two conditional probabilities of belonging to the foreground histogram (P(x|F)) and of belonging to the background histogram (P(x|B)). The single saliency value of pixel x is calculated based on the foreground and background color models according to the following formula:

$$f_3(x) = \frac{P(x|F)}{P(x|F) + P(x|B)} \quad (2)$$

In some implementations, the image engine 204 uses the single saliency values for the pixels in an image to identify salient regions in the image. The image engine 204 first normalizes one or more of the single saliency values to the range [0,1]. The image engine 204 then learns the parameters of an SVM classifier, with a Gaussian kernel, to fuse the information from these saliency cue functions. For each pixel x, the SVM classifier takes as input the one or more of the single saliency values for the saliency cue functions, and produces a global pixel-wise saliency measure $f_G(x)$, which is then again normalized to the range [0,1].

In some implementations, the SVM classifier is trained using training images where humans have hand marked salient rectangles in each. For each training image, a number of random pixels in the interior of the rectangle and the same number in the exterior are selected, and the image engine 204 make a training sample for each of those random pixels by combining the saliency values for that pixel in the four single-cue saliency maps into a four-dimensional vector. For example, 1000 random pixels can be selected in the interior and 1000 random pixels can be selected in the exterior. These four-dimension training vectors can be marked as positive or negative examples based on whether the pixel was on the inside or outside of the human-marked salient region. For training the SVM the image engine 204 can use a predetermined number of iterations of the existing Pegasos SVM training algorithm on those training vectors.

In some implementations, to make a combined saliency map from the individual feature maps after training, the image engine 204 can make a four-dimensional vector for each pixel from the values for that pixel in the four individual feature maps, and supplies the four-dimensional vector to the SVM, which scores the vector, and calculates the combined single saliency value for each pixel. The image engine 204 can then insert the score into the combined saliency map at that pixel.

In some implementations, the image engine 204 identifies an image's salient region by first finding a region, e.g., a rectangle R, that maximizes the following equation:

$$q(R) = \sum_{x \in R} f(x) + \sum_{x \in R^C} 1 - f(x) \quad (3)$$

where f is the combined single saliency value, and $R^C$ is the complement of R.

In order to accomplish the maximization, the image engine 204 uses ESS, a branch and bound technique, described in described in Lampert, Blaschko, and Hofmann, "*Beyond sliding windows: object localization by efficient subwindow search*." IEEE Conference on computer vision and pattern recognition, 2007. To avoid an $O(n^4)$ exhaustive search of all rectangles, ESS prunes parts of the search space that cannot contain the optimal rectangle by applying an upper bound $\hat{q}$ for q over a rectangle set R whose innermost and outermost rectangles are $R_{min}$ and $R_{max}$. The bound must satisfy: $\hat{q}(R) \geq \max_{R \in R} q(R)$ and $\hat{q}(R)=q(R)$ if R is the only element in R. By rewriting Equation (3) as:

$$q(R)=q_1(R)+q_2(R) \quad (4)$$

$$q_1(R) = \sum_{\substack{x \in R, \\ f(x)<0.5}} f(x) + \sum_{\substack{x \in R^C, \\ f(x)<0.5}} 1 - f(x) \quad (5)$$

-continued $$q_2(R) = \sum_{\substack{x \in R, \\ f(x) \geq 0.5}} f(x) + \sum_{\substack{x \in R^C, \\ f(x) \geq 0.5}} 1 - f(x) \quad (6)$$

then a bound that satisfies these requirements is:

$$\hat{q}(R)=q_1(R_{min})+q_2(R_{max}) \quad (7)$$

Figure 3:
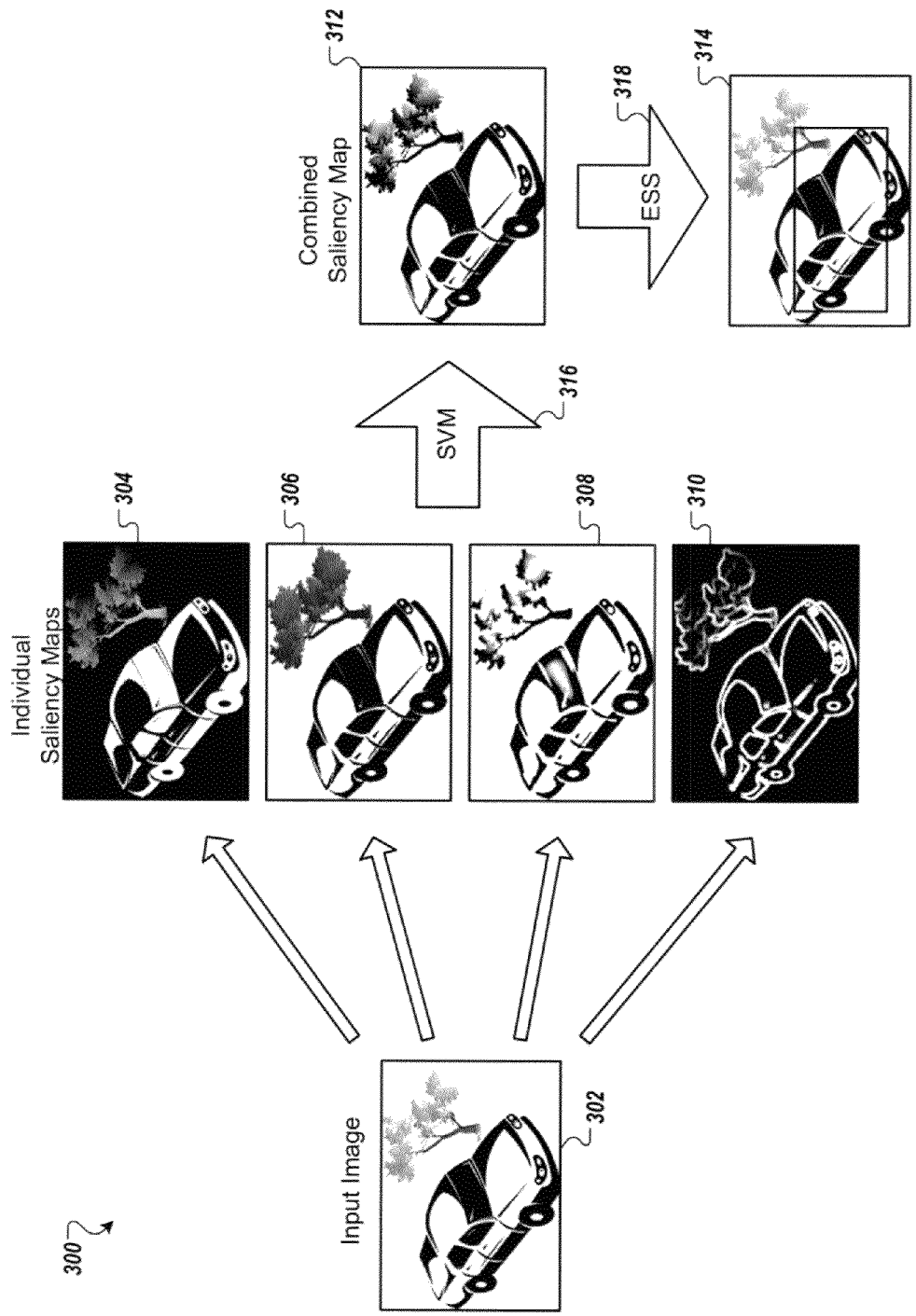
FIG. 3 illustrates saliency maps calculated for an image.

FIG. 3 illustrates saliency cue functions detected on an image 302. FIG. 3 illustrates as an input image, image 302. Four feature maps 304, 306, 308, and 310 have been determined based on four saliency cue functions for the image 302. Saliency map 304 is based on the color spatial distribution cue function. Saliency map 306 is based on the foreground and background color models. Saliency map 308 is based on the super-pixel based center surround distance cue function. Saliency map 310 is based on the multiscale contrast cue function. These four saliency cue functions are processed by the SVM described above to generate a combined saliency map 312, which includes a combined single saliency value for each pixel in the image 302. The combined saliency map 312 including the combined single saliency values are then processed using ESS described above to produce the salient region 314.

Diverse Density

In some implementations, a saliency map is calculated for a set of images, and the saliency map is based on a diverse density measure which gives a segment of an image a high weight if there is a similar segment in most other images in the set, and will give a segment a low weight if most images in the set do not contain a similar segment. The set of images can be associated with a similar topic, e.g., a set of images about "swimming."

In some implementations, the image engine 204 segments each of the images in the set into segments. The images can be segmented using a graph-based segmentation algorithm of Felzenszwalb and Huttenlocher described in P. Felzenszwalb and D. Huttenlocher "*Efficient graph-based image segmentation.*" International Journal of Computer Vision, 2(59): 167-181, 2004.

The image engine 204 identifies the segments that are similar across the image set. For example, in a set of images associated with the topic of "swimming," it is the swimmer that would typically be the most consistent object and thus a saliency map based on multiple images, a diverse density saliency map, will provide higher emphasis on the swimmers.

In some implementation, the image engine 204 computes a diverse density saliency map for each segment indicating how similar the segment is to the other segments in each image in the set of images. For segments $s_i, s_j$ the image engine 204 uses a similarity measure $dist(s_i,s_j)$ that combines a texton histogram, a LAB color histogram, and segment shape information. Given an image X and segment s from some other image in the set, the image engine 204 defines $$dist(s, X) = \min_{segments\, s_i \in X} dist(s, s_i).$$

Therefore, the distance between a segment $s_i$ and image X is defined based on the closest matching segment to $s_i$ in X.

The image engine 204 then defines a diverse density measure, DD, for each segment. Let L be the provided set of related images. For each image X∈L and segment s∈X, the image engine 204 defines $$DD(s,X) = \pi_{Y \in L - \{X\}} \left( \exp^{-dis^2(s,Y)/\sigma^2} \right).$$

As indicated, the product goes over all images Y in the set L other than X. The parameter σ controls the amount by which the diverse density value decays for a segment as the distance of the best matching segment in the other image increases. In some implementations, σ=0.6. Finally, the image engine 204 normalizes DD(s, X) to be in the range [0, 1].

In some implementations, the image engine 204 also calculates a single saliency map for each pixel in the image using the saliency cue functions described above. The image engine 204 then combines the single saliency maps of each image with the diverse density saliency map to create a combined saliency map in which the value for each pixel P of image X∈L is wDD(p)+(1−w)f(p) where DD(p) is the value of DD(s,X) for segment s that includes p, and f(p) is the combined single saliency value for the pixel calculated as described above. In some implementations, w=0.6.

In some implementations, the image engine 204 determines the salient region of the pixels with the subwindow search based on the combined diverse density saliency values using the following formula, as described above.

$$q(R) = q_1(R) + q_2(R) \quad (4)$$

$$q_1(R) = \sum_{\substack{x \in R, \\ f(x) < 0.5}} f(x) + \sum_{\substack{x \in R^C, \\ f(x) < 0.5}} 1 - f(x) \quad (5)$$

$$q_2(R) = \sum_{\substack{x \in R, \\ f(x) \geq 0.5}} f(x) + \sum_{\substack{x \in R^C, \\ f(x) \geq 0.5}} 1 - f(x) \quad (6)$$

then a bound that satisfies these requirements is:

$$\hat{q}(R) = q_1(R_{min}) + q_2(R_{max}) \quad (7)$$

Figure 4:
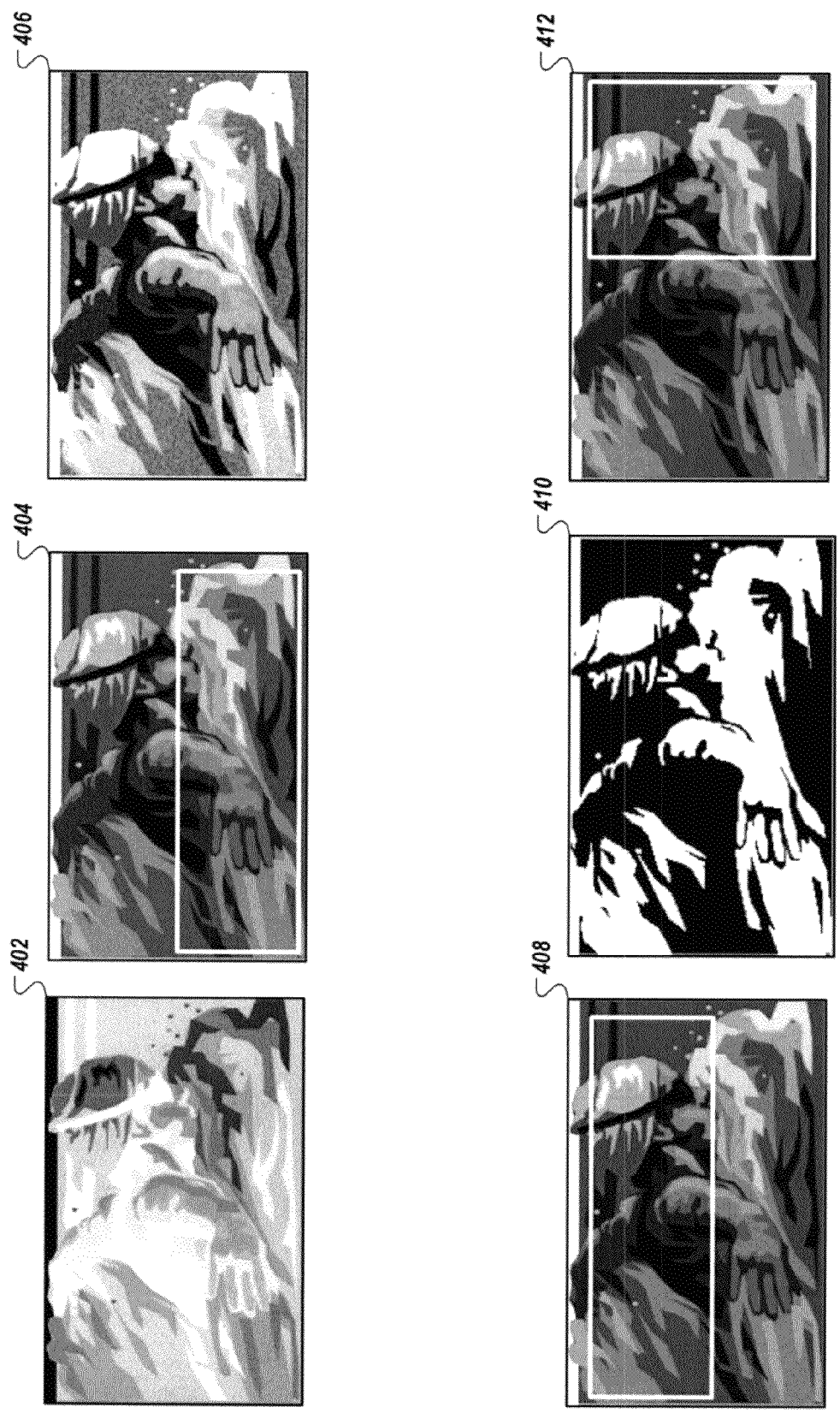
FIG. 4 illustrates images that have salient regions detected using the diverse density saliency map.

FIG. 4 illustrates images that have salient regions detected using the diverse density saliency map. FIG. 4 illustrates an example in which the single saliency map 402 focuses on a portion of the image. The salient region 402 is determined with the subwindow search described above based on the saliency map 404. In contrast the diverse density saliency map 406 focuses on a segment that includes both the swimmer and some of the pool. The salient region 408 is determined with the subwindow search based on the single saliency map 404 and the diverse density saliency map 406. By combining these two maps into a combined map 410, a much better salient region 412 is obtained.

Color Models

Figure 5A:
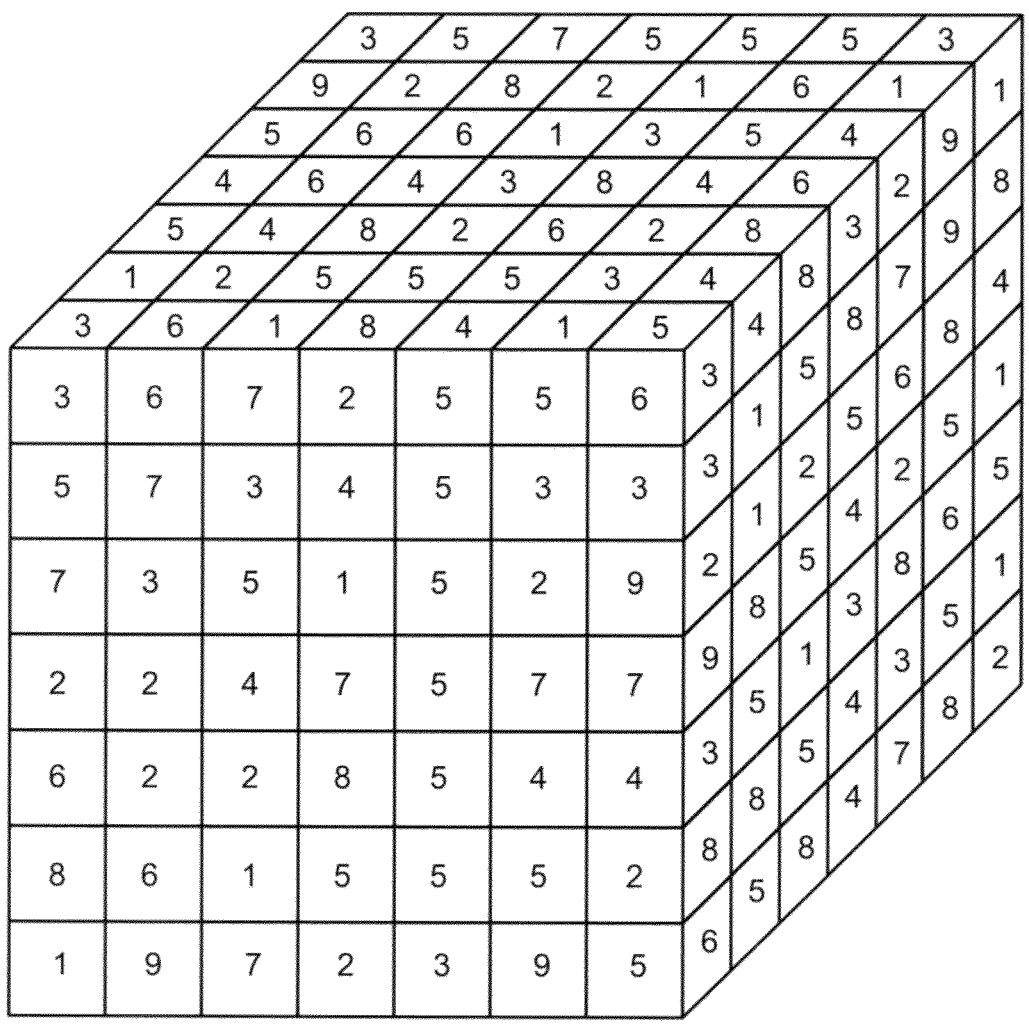
FIG. 5a illustrates a histogram displaying counts of RGB pixel values.

In some implementations, the image engine 204 identifies color models 208-210 using the salient regions 206 found in random subsets of the images using either the single saliency method or the diverse density method. By way of illustration, color models 208 to 210 from candidate salient regions in 1,000 random subsets of the images can be used, and the color models can be 7×7×7 histograms of the RGB color values inside and outside the rectangles, as shown in FIG. 5a.

In some implementations, the image engine 204 builds foreground and background color models using the salient regions 206. Foreground and background models are built for a number of random sets of images. For example, 1000 foreground and background models are built using subsets of 10 or more of the images. Each model can be a histogram of RGB values inside and outside of the regions. For example the models are 10×10×10 histograms of the RGB values.

For each color model 208-210 and image combination, the image engine 204 identifies a color model candidate region 207 that best matches the color models 208-210. The image engine 204 identifies the color model candidate region 207 by identifying the image rectangle R whose interior and exterior histograms $h^R$, $h^{R^C}$ best match the model's foreground and background histograms $h^F$, $h^B$, by minimizing with respect to R:

$$\chi^2(h^F, h^R) + \chi^2(h^B, h^{R^C}) \quad (8)$$

where $R^C$ is the complement of R, and:

$$\chi^2(h, h') = \sum_{k=1}^{K} \frac{(h_k - h'_k)^2}{h_k + h'_k} \quad (9)$$

In some implementations, the image engine 204 scores each foreground and background model 208-210 using the sum of $\chi^2$ distances between the interior and exterior histograms of the rectangles found above. The image engine 204 can select the model with the highest score as the final model.

In some implementations, the image engine 204 identifies a final salient region 212 in each image based on the score of each color model. The image engine 204 identifies the color model with the highest score and identifies as the final salient region for each image, the color model candidate region identified using the identified color model with the highest score.

FIG. 5a illustrates a histogram displaying counts of RGB pixel values. The histogram 500 is a 7×7×7 histogram showing the counts of RGB pixel values, representing a model of colors in an images' foreground or background.

Figure 5B:
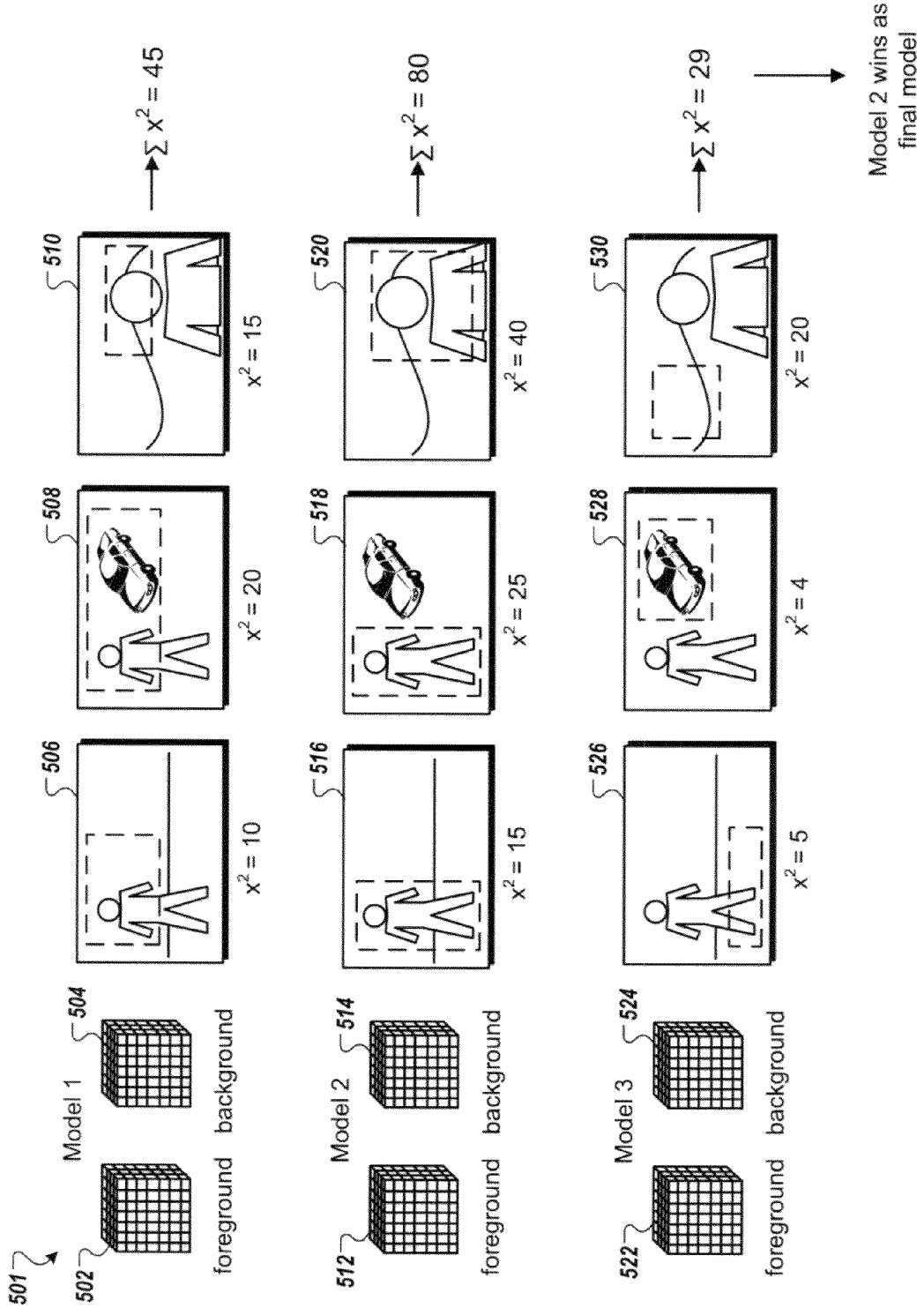
FIG. 5b illustrates identifying a salient region candidate that best matches a color model.

FIG. 5b illustrates identifying a salient region candidate that best matches a color model. FIG. 5b shows three images 506, 508, and 510 and three color models 501, 511, and 521. Each color model includes a 7×7×7 histogram for the foreground (502, 512, 522) and a 7×7×7 histogram for the background (504, 514, 524). In each image, the candidate salient region that best matches the color model is shown.

For example, image 506 includes a region 507 that best matches the color model 1. Image 508 includes a region 509 that best matches the color model 1. Image 510 includes a region 511 that best matches the color model 1. Image 506 includes a region 516 that best matches the color model 2. Image 508 includes a region 518 that best matches the color model 2. Image 510 includes a region 520 that best matches the color model 2. Image 506 includes a region 526 that best matches the color model 3. Image 508 includes a region 528 that best matches the color model 3. Image 510 includes a region 530 that best matches the color model 3.

Below each image is the chi-squared distance in color pixel histograms between the interior of the box and the exterior of the box. The chi squared distance is calculated using Algorithm 1 described above.

For example, the chi-squared distance of image 506 for the color model 1 is 10, the chi-squared distance of image 508 for the color model 1 is 20, and the chi-squared distance of image 510 for the color model 1 is 15. The chi-squared distance of image 506 for the color model 2 is 15, the chi-squared distance of image 508 for the color model 2 is 25, and the chi-squared distance of image 510 for the color model 2 is 40. The chi-squared distance of image 506 for the color model 3 is 5, the chi-squared distance of image 508 for the color model 3 is 4, and the chi-squared distance of image 510 for the color model 3 is 20.

The sum chi-squared distances for each color model is also displayed. For color model 1 the total sum is 45, for color model 2 the total sum is 80, and for color model 3 the total sum is 29.

The sum of chi-squared distances for each model are compared and the greatest distance, 80 for model 2 is selected. Therefore model 2 is selected as the model that best describes the common foreground object in the images.

Figure 6:
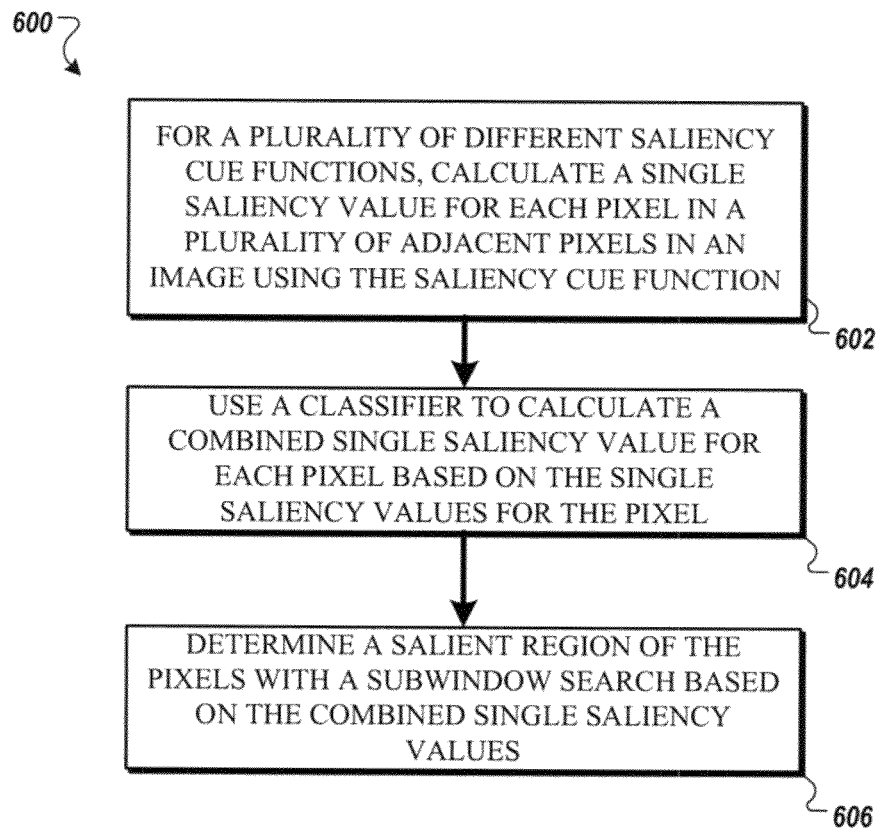
FIG. 6 illustrates an example process for detecting salient regions on an image.

FIG. 6 illustrates an example process for detecting salient regions on an image. For a plurality of different saliency cue functions, a single saliency value is calculated for each pixel in a plurality of adjacent pixels in an image using the saliency cue function, wherein one of the saliency cue functions is based on whether the pixel is in a region of the pixels whose colors contrast with the region's background and another of the saliency cue functions is based on foreground and background color models of the image (602). For example, the image engine 204 can, for a plurality of different saliency cue functions, calculate a single saliency value for each pixel in a plurality of adjacent pixels in an image using the saliency cue function, wherein one of the saliency cue functions is based on whether the pixel is in a region of the pixels whose colors contrast with the region's background and another of the saliency cue functions is based on foreground and background color models of the image. A classifier is used to calculate a combined single saliency value for each pixel based on the single saliency values for the pixel (604). For example, the image engine 204 can use a classifier to calculate a combined single saliency value for each pixel based on the single saliency values for the pixel. The classifier can be an SVM. A salient region of the pixels is determined with a subwindow search based on the combined single saliency values (606). For example, the image engine 204 can determine a salient region of the pixels with a subwindow search based on the combined single saliency values.

Figure 7:
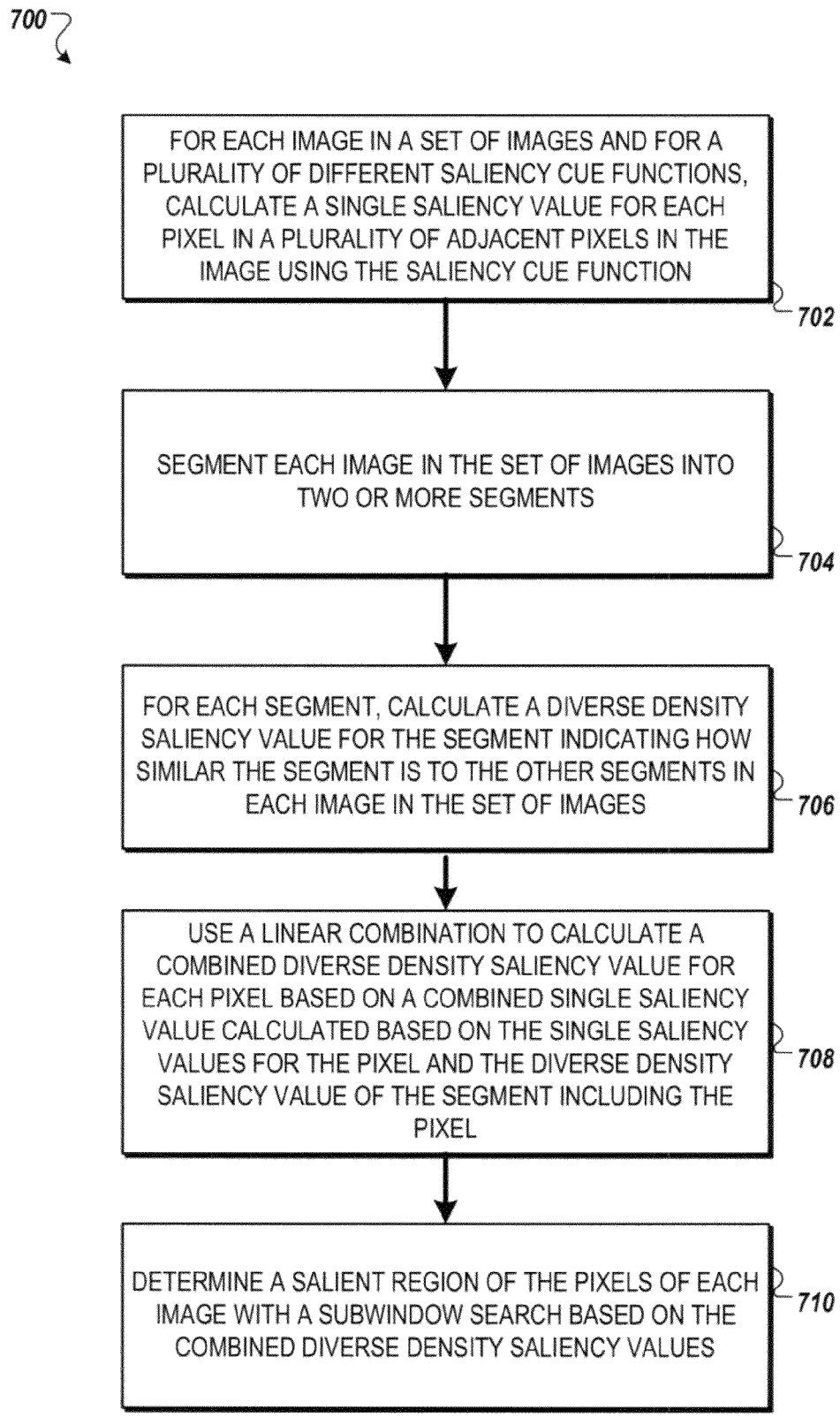
FIG. 7 illustrates another example process for detecting salient regions on an image.

FIG. 7 illustrates another example process for detecting salient regions on an image. For each image in a set of images and for a plurality of different saliency cue functions, a single saliency value is calculated for each pixel in the image using the saliency cue function, wherein one of the saliency cue functions is based on whether the pixel is in a region of the image whose colors contrast With the region's background and another of the saliency cue functions is based on foreground and background color models of the image (702). For example, the image engine 204 can calculate a single saliency value for each pixel in the image using the saliency cue function, wherein one of the saliency cue functions is based on whether the pixel is in a region of the image whose colors contrast with the region's background and another of the saliency cue functions is based on foreground and background color models of the image. Each image is segmented in the set of images into two or more segments (704). For example, the image engine 204 can segment each image in the set of images into two or more segments. For each segment, a diverse density saliency value is calculated for the segment indicating how similar the segment is to the other segments in each image in the set of images (706). For example, the image engine 204 can, for each segment, a diverse density saliency value is calculated for the segment indicating how similar the segment is to the other segments in each image in the set of images. A linear combination is used to calculate a combined single saliency value for each pixel based on a combined single saliency value calculated based on the single saliency values for the pixel and the diverse density saliency value of the segment including the pixel (708). For example, the image engine 204 can use a linear combination to calculate a combined single saliency value for each pixel based on a combined single saliency value calculated based on the single saliency values for the pixel and the diverse density saliency value of the segment including the pixel. A salient region of the pixels of each image is determined with a subwindow search based on the combined single saliency values (710). For example, a salient region of the pixels of each image is determined with a subwindow search based on the combined single saliency values.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   identifying sample regions that each include a plurality of adjacent pixels of an image;
   calculating, for pixels in the sample regions and by one or more processors, a foreground saliency value of the pixel based, at least in part, on a conditional probability that the pixel is a foreground pixel based on a foreground color model and a conditional probability that the pixel is a background pixel based on a background color model;

using a classifier to calculate a respective combined saliency value for each pixel based on the foreground saliency value for the pixel and a saliency value for at least one different saliency cue function wherein the classifier is trained on training image and corresponding saliency values and wherein the respective combined saliency value for each of the training images comprise saliency values for a plurality of respective pixels in the training image; and determining, by one or more processors, a salient region of the pixels with a subwindow search based on the respective combined saliency values in a rectangle that maximizes a sum of combined saliency values of pixels in the rectangle and a complement of the combined saliency values of the pixels in the rectangle.

2. The method of claim 1, wherein the classifier is a support vector machine.

3. The method of claim 1, wherein one of the saliency cue functions is based on whether the pixel is in a region of the pixels whose colors contrast with the region's background and another of the saliency cue functions is based on foreground and background Gaussian mixture models.

4. The method of claim 3, further comprising segmenting the plurality of adjacent pixels into super-pixels and using a super-pixel algorithm process to determine the region including the pixel that has the highest difference with its background.

5. A non-transitory computer storage medium encoded with a computer program, the program comprising instructions that when executed by one or more data processing apparatus cause the one or more data processing apparatus to perform operations comprising:

identifying sample regions that each include a plurality of adjacent pixels of an image;

calculating, for pixels in the sample regions, a foreground saliency value of the pixel based, at least in part, on a conditional probability that the pixel is a foreground pixel based on a foreground color model and a conditional probability that the pixel is a background pixel based on a background color model;

using a classifier to calculate a respective combined saliency value for each pixel based on the foreground saliency value for the pixel and a saliency value for at least one different saliency cue function wherein the classifier is trained on training images and corresponding saliency values, and wherein the respective combined saliency value for each of the training images comprise saliency values for a plurality of respective pixels in the training image; and determining a salient region of the pixels with a subwindow search based on the respective combined saliency values in a rectangle that maximizes a sum of combined saliency values of pixels in the rectangle and a complement of the combined saliency values of the pixels in the rectangle.

6. The computer storage medium of claim 5, wherein the classifier is a support vector machine.

7. The computer storage medium of claim 5, wherein one of the saliency cue functions is based on whether the pixel is in a region of the pixels whose colors contrast with the region's background and another of the saliency cue functions is based on foreground and background Gaussian mixture models.

8. The computer storage medium of claim 7, wherein the instructions cause the one or more data processing apparatus to perform operations further comprising segmenting the plurality of adjacent pixels into super-pixels and using a super-pixel algorithm process to determine the region including the pixel that has the highest difference with its background.

9. A system comprising:

a data storage device storing instructions; and one or more data processing apparatus that interact with the data storage device and execute instructions that cause the one or more data processing apparatus to perform operation comprising:

identifying sample regions that each include a plurality of adjacent pixels of an image;

calculating, for pixels in the sample regions, a foreground saliency value of the pixel based, at least in part, on a conditional probability that the pixel is a foreground pixel based on a foreground color model and a conditional probability that the pixel is a background pixel based on a background color model;

using a classifier to calculate a respective combined saliency value for each pixel based on the foreground saliency value for the pixel and a saliency value for at least one different saliency cue function wherein the classifier is trained on training images and corresponding saliency values, and wherein the respective combined saliency value for each of the training images comprise saliency values for a plurality of respective pixels in the training image; and determining a salient region of the pixels with a subwindow search based on the respective combined saliency values in a rectangle that maximizes a sum of combined saliency values of pixels in the rectangle and a complement of the combined saliency values of the pixels in the rectangle.

10. The system of claim 9, wherein the classifier is a support vector machine.

11. The system of claim 9, wherein one of the saliency cue functions is based on whether the pixel is in a region of the pixels whose colors contrast with the region's background and another of the saliency cue functions is based on foreground and background Gaussian mixture models.

12. The system of claim 11, wherein the instructions cause the one or more data processing apparatus to perform operations further comprising segmenting the plurality of adjacent pixels into super-pixels and using a super-pixel algorithm process to determine the region including the pixel that has the highest difference with its background.

* * * * *